Patented Sept. 14, 1926.

1,599,618

UNITED STATES PATENT OFFICE.

WILLIAM KOEHLER, OF CLEVELAND, OHIO.

PROCESS FOR FORMING METAL COMPOUNDS AND MIXTURES INVOLVING PHOSPHORUS.

No Drawing. Application filed February 28, 1923. Serial No. 621,948.

This invention relates to a new and improved process for forming metal compounds and mixtures and particularly to metal compounds involving phosphorus.

The object of this invention is to provide a process for producing metal compounds and mixtures and particularly phosphides, such as copper phosphide, which will be simple to operate, very economical, and which will permit a very accurate control over the quantity of ingredients or elements entering into the metal compound or mixture.

With these objects in view and with the intention of securing other advantages which will hereinafter appear, my invention consists in the method of procedure described in the specification and pointed out in the claims.

In carrying out my process I take a predetermined quantity of a metal as the base metal and reduce the metal to a finely comminuted state, by any of the well known methods. I then take a quantity of phosphorus of the proper proportion relative to the quantity of the base metal and reduce the phosphorus to a finely divided state. The base metal and the phosphorus are then intimately mixed, and are subjected to pressure in a suitable mold. After the base metal and the phosphorus have been mixed and pressed the resultant mass may be subjected to heat treatment, preferably in a reducing atmosphere.

The phosphorus may be reduced to a finely comminuted condition by dissolving the phosphorus in a suitable solvent, such as carbon disulphide and then evaporating the solvent. But owing to the danger of combustion it is best to mix the base metal and the comminuted phosphorus together while the phosphorus is still in solution and then eliminate the solvent during the pressing operation.

The preferable method, however, to handle the phosphorus is to first convert the phosphorus to red phosphorus by subjecting the phosphorus to a temperature of 230° C. out of contact with the air. It may be noted here that this allotropic modification of phosphorus may be changed back into ordinary phosphorus by continuing the heat treatment and raising the temperature to 260° C. The red phosphorus when formed is in a finely comminuted condition and can be readily mixed with the powdered base metal. As the red phosphorus is not poisonous and will not take fire at ordinary temperatures, it can be freely handled in the open air.

As a concrete example of carrying out my process, I will describe the production of copper phosphide;

A predetermined quantity of copper is reduced to a finely comminuted state, preferably by grinding precipitated copper. A predetermined quantity of ordinary phosphorus or its allotropic modification in a finely comminuted state is then intimately mixed with the copper powder. The mixture is then subjected to pressure in a suitable mold. The resultant mass may be subjected to heat treatment and especially when red phosphorus is used it is preferable to subject the pressed mass to a temperature above 260° C.

I have found that the pressing of the intimately mixed powdered copper and phosphorus produces a chemical association, but when the allotropic modification of phosphorus is used the subsequent heat treatment is necessary to complete the reaction.

My process for forming metal compounds or mixtures will be found especially adaptable in cases where it is desirable that the metal compound or mixture shall carry a quantity of a material in the nature of a lubricant. For instance in the production of anti-friction compounds, graphite or other materials having lubricating properties may be mixed with the comminuted metal and the phosphorus.

That is, if instead of making a straight copper phosphide, it is desirable to produce an anti-friction compound, then the phosphorus and the copper would be taken as before described but previous to the pressing operation, a predetermined quantity of graphite in a powdered condition would be added to the mix and the mixture subjected to pressure as before described.

What I claim is:—

1. The process of producing metallic phosphides, consisting in mixing a finely comminuted metal with phosphorus in a finely divided condition and then subjecting the mixture to a predetermined pressure.

2. The process of producing metallic phosphides consisting in mixing a comminuted metal with phosphorus in a finely divided condition, subjecting the resultant mixture to pressure and then heat treating the pressed mass.

3. The process of producing metallic phosphides, consisting in first subjecting to a predetermined pressure the product obtained by intimately mixing phosphorus or a phosphorus bearing compound with a metal or a metal bearing compound and then heating the pressed mass to a predetermined temperature.

4. The process of producing metallic phosphides consisting in mixing a finely comminuted metal with phosphorus in a liquid solution, subjecting the resultant mixture to pressure and then heat treating the pressed mass.

5. The process of producing metallic phosphides consisting in taking a predetermined quantity of phosphorus and subjecting it to heat sufficient to convert the phosphorus to red phosphorus, then mixing with the red phosphorus a predetermined quantity of metal in a finely comminuted state and subjecting the resultant mixture to pressure.

6. The process of producing metallic phosphides consisting in taking a predetermined quantity of phosphorus and subjecting it to heat sufficient to convert the phosphorus to red phosphorus, then mixing with the red phosphorus a predetermined quantity of a metal in a finely comminuted state, subjecting the resultant mixture to pressure and then heat treating the pressed mass.

7. The process for forming metal compounds or mixtures containing a proportion of phosphorus, consisting in reducing the phosphorus to a finely divided condition, then mixing therewith in a finely comminuted state, the metal and other material forming the balance of the mixture and subjecting the resultant mixture to pressure.

8. The process for forming metal compounds or mixtures, containing a proportion of phosphorus, consisting in reducing the phosphorus to a finely divided condition, then mixing therewith in a finely comminuted state the metal and other material forming the balance of the mixture, subjecting the resultant mixture to pressure and heat treating the pressed mass.

9. The process for forming a metal compound or mixture consisting in mixing together finely divided phosphorus and copper in a finely comminuted state, subjecting the resultant mass to pressure and then heat treating.

10. The process for forming metal compounds or mixtures consisting in mixing phosphorus in a finely divided state together with copper powder and powdered graphite, subjecting the resultant mixture to pressure and then heat treating.

11. The process for forming metal compounds or mixtures consisting in mixing red phosphorus in a finely divided state together with copper powder, subjecting the resultant mass to pressure and then heat treating.

12. The process for forming metal compounds or mixtures consisting in mixing red phosphorus in a finely divided state together with copper powder and powdered graphite, then subjecting the resultant mass to pressure and then heat treating.

In testimony whereof I have affixed my signature this 23rd day of February, 1923.

WILLIAM KOEHLER.